(12) United States Patent
Park et al.

(10) Patent No.: US 8,222,849 B2
(45) Date of Patent: Jul. 17, 2012

(54) MOTOR CONTROL METHOD FOR MDPS SYSTEM

(75) Inventors: Kisung Park, Hwaseong-si (KR); Soobo Park, Hwaseong-si (KR)

(73) Assignees: Kia Motors Corporation, Seoul (KR); Hyundai Motor Company, Seoul (KR)

(*) Notice: Subject to any disclaimer, the term of this patent is extended or adjusted under 35 U.S.C. 154(b) by 367 days.

(21) Appl. No.: 12/615,651

(22) Filed: Nov. 10, 2009

(65) Prior Publication Data

US 2010/0141195 A1 Jun. 10, 2010

(30) Foreign Application Priority Data

Dec. 4, 2008 (KR) ........................ 10-2008-0122726

(51) Int. Cl.
*H02P 7/00* (2006.01)
*H02P 27/00* (2006.01)
*H02P 27/04* (2006.01)

(52) U.S. Cl. ........ 318/473; 318/434; 318/438; 318/798; 318/800; 318/805; 318/812

(58) Field of Classification Search .................. 318/434, 318/438, 473, 798, 800, 805, 812
See application file for complete search history.

(56) References Cited

U.S. PATENT DOCUMENTS

| 6,380,706 | B1* | 4/2002 | Kifuku et al. ................. 318/434 |
| 7,203,583 | B2* | 4/2007 | Fujimoto et al. ............... 701/41 |
| 7,792,619 | B2* | 9/2010 | Uryu ............................. 701/41 |
| 2002/0014877 | A1* | 2/2002 | Kaji et al. ...................... 318/783 |
| 2005/0205344 | A1* | 9/2005 | Uryu ............................. 180/446 |
| 2008/0154462 | A1* | 6/2008 | Yamamoto ....................... 701/41 |
| 2009/0121573 | A1* | 5/2009 | Ikeno ............................ 310/195 |
| 2009/0230805 | A1* | 9/2009 | Ikeno ............................ 310/195 |

FOREIGN PATENT DOCUMENTS

| JP | 8-133107 A | 5/1996 |
| JP | 2001-191933 A | 7/2001 |
| JP | 2006-341795 A | 12/2006 |
| KR | 2002-0021500 A | 3/2002 |
| KR | 10-2006-0077240 A | 7/2006 |

* cited by examiner

*Primary Examiner* — Walter Benson
*Assistant Examiner* — Gabriel Agared
(74) *Attorney, Agent, or Firm* — Morgan, Lewis & Bockius LLP

(57) ABSTRACT

A motor control method for an MDPS system makes it possible to provide smoother and easier steering operation at a low cost by improving the OHP performance while supplying appropriate controlling electric current to a motor, without changing the motor or a decelerator used in an MDPS system.

2 Claims, 2 Drawing Sheets

| ITEM | RELATED ART | PRESENT INVENTION |
|---|---|---|
| MAXIMUM ELECTRIC CURRENT TIME | 65 SEC. | 85 SEC. |
| MAXIMUM MOTOR ELECTRIC CURRENT | 65A | 65A(INITIAL STATE) |
| ELECTRIC CURRENT REDUCTION COEFFICIENT (MAXIMUM) | −1A/sec | A1 : −0.3A/sec |
| | | A2 : −2A/sec |
| MINIMUM MOTOR ELECTRIC CURRENT (NEUTRAL ELECTRIC CURRENT) | 11.7A | A1 : 32A |
| | | A2 : 11.7A |
| ELECTRIC CURRENT INCREASE COEFFICIENT | 0.049A/sec | A1 : 1A/sec |
| | | A2 : 0.049A/sec |

MOTOR CONTROL METHOD FOR MDPS SYSTEM

CROSS-REFERENCE TO RELATED APPLICATION

The present application claims priority of Korean Patent Application No. 10-2008-0122726, filed on Dec. 4, 2008, the entire contents of which application is incorporated herein for all purposes by this reference.

BACKGROUND OF THE INVENTION

1. Field of the Invention

The present invention relates to a motor control method for a Motor Driven Power Steering (MDPS) system, particularly a technology that allows steering operation as smooth as possible while preventing damage to a motor due to heat.

2. Description of Related Art

Unlike a hydraulic power steering system using driving force of an engine, an MDPS system provides steering force from driving force of a motor, such that it has an advantage of reducing fuel consumption of a vehicle, but is expensive as compared with the hydraulic power steering system.

Therefore, an MDPS system using an inexpensive DC motor, not a BLAC motor, has been developed to reduce the cost of the MDPS system, however, the motor has a problem in that large amount of heat is generated and it is difficult to discharge the heat.

An MDPS system is basically provided with an Over Heat Protection (OHP) logic to prevent a motor from overheating, and the OHP logic is activated earlier when using a DC motor as described above than when using a BLAC motor.

The OHP logic is provided to restrain electric current that is supplied to the motor, such that when the OHP logic is activated, the steering force supplied from the motor is rapidly decreased and a driver feels the steering wheel heavy.

Therefore, it is the main performance of the MDPS system how long it is possible to steer a vehicle before the OHP logic is activated, which is called 'OHP performance' and is estimated by the number of left-right full turn of the steering wheel before the OHP logic is activated under predetermined conditions.

In order to improve the OHP performance, the method of increasing the capacity of the motor have been known in the art; however, this method are not preferable because the size and capacity of the motor, such that it is difficult to mount and dispose them in a vehicle and the cost is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention help provide a motor control method for an MDPS system that makes it possible to provide smoother and easier steering operation at a low cost by improving the OHP performance, without changing the motor or a decelerator used in an MDPS system A motor control method for an MDPS system according to the present invention includes a step of OHP that decreases electric current supplied to a motor to a second electric current reduction coefficient to prevent the motor from overheating, and a step of Pre-OHP that gradually decreases the electric current supplied to the motor to a first electric current reduction coefficient smaller than the second electric current reduction coefficient.

It is preferable to set the second electric current reduction coefficient five times or more larger than the first electric current reduction coefficient.

The motor control method for an MDPS system may be configured such that, in the step of Pre-OHP, the electric current supplied to the motor is decreased from the maximum motor electric current to the first electric current reduction coefficient until a predetermined first minimum motor electric current smaller than the maximum motor electric current that can be supplied to the motor, and then when the electric current supplied to the motor becomes smaller than the first minimum motor electric current, the electric current supplied to the motor is increased to a first electric current increase coefficient having the absolute value larger than the first electric current reduction coefficient.

The motor control method for an MDPS system may be configured such that, in the step of OHP, the electric current supplied to the motor is decreased to the second electric current reduction coefficient until the electric current supplied to the motor is a predetermined second minimum motor electric current smaller than the first minimum motor electric current, and when the electric current supplied to the motor becomes smaller than the second minimum motor electric current, the electric current supplied to the motor is increased to a second electric current increase coefficient smaller than the first electric current increase coefficient.

The present invention makes it possible to provide smoother and easier steering operation at a low cost by improving the OHP performance, without changing the motor or a decelerator used in an MDPS system.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
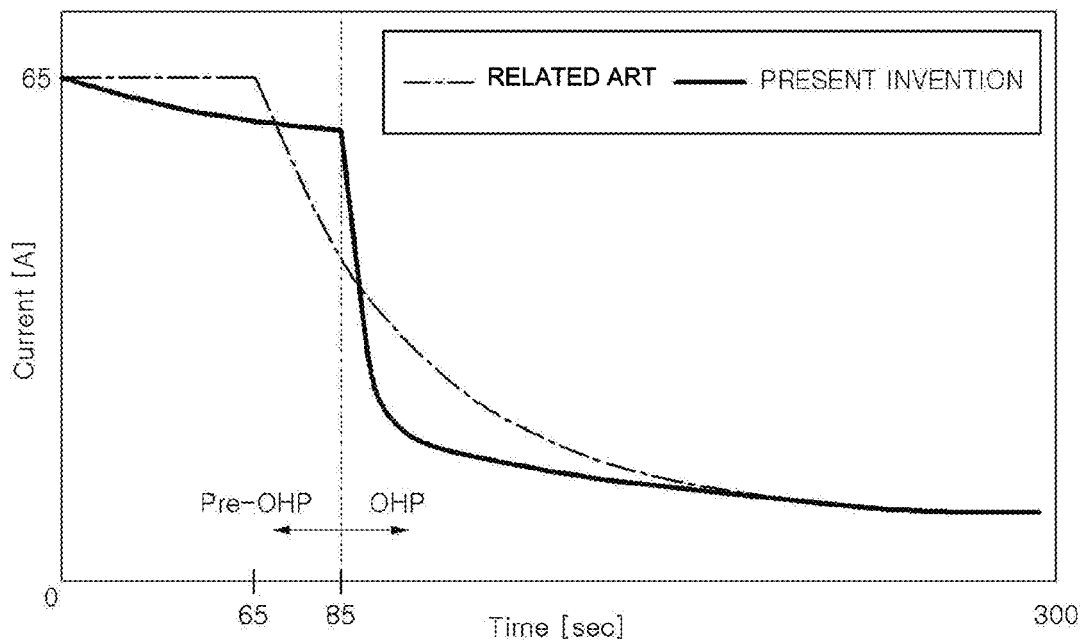
FIG. 1 is a view comparing a motor control method for an MDPS system according to the present invention with the related art, by way of a specific example.
Figure 2:
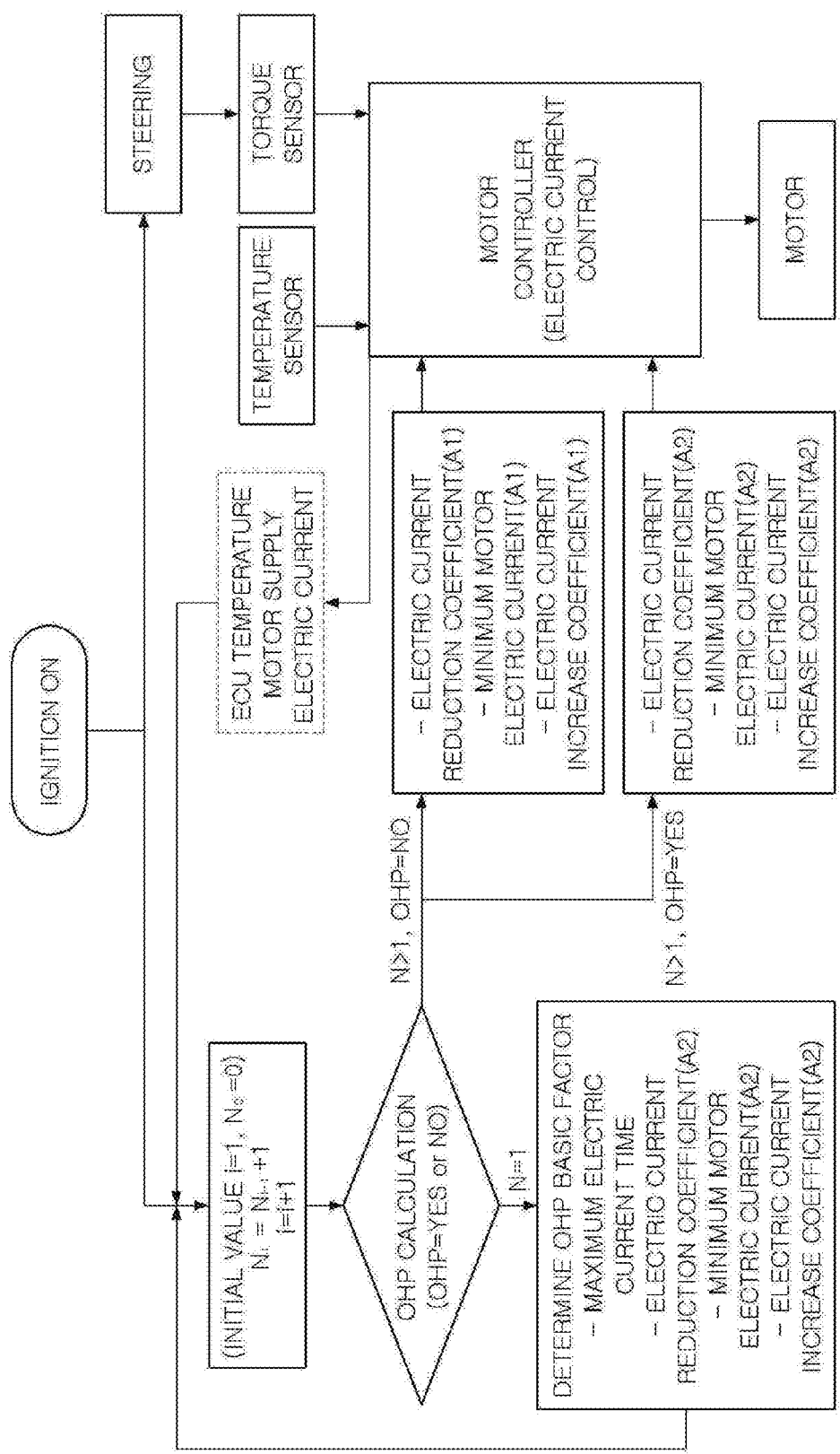
FIG. 2 is a flowchart illustrating an example of a motor control method for an MDPS system according to the present invention.

Referring to FIGS. 1 and 2, a motor control method for an MDPS system according to various embodiments of the present invention includes a step of OHP that decreases electric current supplied to a motor to a second electric current reduction coefficient to prevent the motor from overheating, and/or a step of Pre-OHP that gradually decreases the electric current supplied to the motor to a first electric current reduction coefficient smaller than the second electric current reduction coefficient, before the step of OHP.

It is preferable to set the second electric current reduction coefficient five times or more larger than the first electric current reduction coefficient.

That is, FIG. 1 compares a motor control method for an MDPS system according to various embodiments with the related art, by way of a specific example. In the related art, the maximum electric current of 65A is continuously supplied to a motor until the maximum electric current time of 65 seconds, and then the electric current supplied to the motor is decreased to a predetermined electric reduction coefficient by the operation of the OHP.

On the other hands, assuming that the present invention uses the same motor, the maximum electric current time is set longer than the related art to 85 seconds, and the maximum electric current is not maintained at 65A, but the electric current supplied to the motor is gradually decreased to the first electric current reduction coefficient in the step of Pre-OHP before the step of OHP and then the electric current of the motor is decreased to the second electric current reduction coefficient that is larger than the electric current reduction coefficient in the related art as well as the first electric current reduction coefficient, in the step of OHP.

Accordingly, when electric current is supplied to a motor having the same heat capacity, the present invention provides the step of Pre-OHP instead of setting the maximum electric current time longer than the related art, such that all the maximum electric current of 65A is not substantially supplied, but electric current that is gradually decreased from the maximum electric current is supplied even during the maximum electric current time, and the heating load that is applied to the motor can be maintained substantially at the same level by relatively more rapidly decreasing the electric current supplied to the motor than the related art in the step of OHP after the maximum electric current time.

The above method substantially extends the time taken to reach the step of OHP, and as a result, this means that relatively larger amount of steering can be performed until the OHP operation, thereby improving the OHP performance.

Further, when the electric current supplied to the motor is decreased to more rapid second electric current reduction coefficient than the related art in the step of OHP, the steering force supplied from the motor is rapidly decreased and the driver feels the steering wheel heavy. However, the driver cannot substantially recognize a change in the feeling, as compared with the related art that the electric current is decreased to a less rapid electric current reduction coefficient than the second electric current reduction coefficient, which is not a big problem.

For reference, FIG. 1 illustrates only when electric current supplied to a motor is decreased with the steering wheel maintained at the maximum rotational position in one direction to help understanding. However, in the practical steering operation, the steering wheel turned to the maximum position in one direction is not continuously maintained and repeatedly reciprocate from the maximum position to the neutral position.

Therefore, in the step of Pre-OHP, the electric current supplied to the motor is decreased from the maximum motor electric current to the first electric current reduction coefficient until a predetermined first minimum motor electric current smaller than the maximum motor electric current that can be supplied to the motor, and then when the electric current supplied to the motor becomes smaller than the first minimum motor electric current, the electric current supplied to the motor is increased to a first electric current increase coefficient having the absolute value larger than the first electric current reduction coefficient.

That is, the electric current supplied to the motor will be smaller than the first minimum motor electric current, for example, when the steering wheel is at the neutral position.

In this position, the first electric current increase coefficient is decreased by the first electric current reduction coefficient, but rapidly recovers the electric current, such that it is possible to provide the driver with smooth steering force.

Similar to the step of Pre-OHP, in the step of OHP, the electric current supplied to the motor is decreased to the second electric current reduction coefficient until the electric current supplied to the motor is a predetermined second minimum motor electric current smaller than the first minimum motor electric current, and when the electric current supplied to the motor becomes smaller than the second minimum motor electric current, the electric current supplied to the motor is increased to a second electric current increase coefficient smaller than the first electric current increase coefficient.

In this step, heating load has been sufficiently accumulated in the motor; therefore, it is possible to ensure sufficient time for the motor to be cooled by setting the second electric current increase coefficient small to recover the electric current of the motor.

The maximum electric current time and electric current reduction coefficient and the minimum motor electric current and electric current increase coefficient described in the above are values that are determined as functions of the temperature of a motor controller when starting the vehicle, and are inputted in advance by experiments and analysis.

For reference, the flowchart shown in FIG. 2 illustrates an example of determining the maximum electric current time, the second electric current reduction coefficient, the second minimum motor electric current, and the second electric current increase coefficient from a map determined according to the temperature of the motor controller when starting the vehicle, and using predetermined values as the first electric current reduction coefficient, the first minimum motor electric current, and the first electric current increase coefficient. However, the first electric current reduction coefficient, the first minimum motor electric current, and the first electric current increase coefficient may be set differently according to the temperature of the motor controller, if necessary.

According to the flowchart shown in FIG. 2, as steering is performed by ignition-on, a torque sensor measures the steering and transmits a signal to the motor controller, the motor controller controls the motor in response to the signal inputted from the torque sensor and reads the temperature of the motor controller in response to a signal from a temperature sensor. The motor controller first sets a maximum electric current time, a second electric reduction coefficient, a second minimum motor electric current, and a second electric current increase coefficient corresponding to the temperature, and then determines whether the OHP operation is performed from calculation. Thereafter, the motor controller controls electric current supplied to the motor using the first electric reduction coefficient, the first minimum motor electric current, and the first electric current increase coefficient in the step of Pre-OHP before the step of OHP, and controls the electric current supplied to the motor using the second electric current reduction coefficient, the second minimum motor electric current, and the second electric current increase coefficient. Therefore, it is possible to make the time before the step of OHP relatively longer than the related art by maximally using characteristics of the motor while preventing the motor from being damaged by heat, thereby extending smooth steering condition for the driver.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A motor control method for an MDPS system, the method comprising:
   an OHP step that decreases electric current supplied to a motor to a second electric current reduction coefficient to prevent the motor from overheating; and
   a Pre-OHP step that gradually decreases the electric current supplied to the motor to a first electric current reduction coefficient smaller than the second electric current reduction coefficient, before the step of OHP;
   wherein the second electric current reduction coefficient is set five times or more larger than the first electric current reduction coefficient; and
   wherein in the step of Pre-OHP, the electric current supplied to the motor is decreased from the maximum motor electric current to the first electric current reduction coefficient until a predetermined first minimum motor electric current smaller than the maximum motor electric current that can be supplied to the motor, and then when the electric current supplied to the motor becomes smaller than the first minimum motor electric current, the electric current supplied to the motor is increased to a first electric current increase coefficient having the absolute value larger than the first electric current reduction coefficient.

2. The motor control method for an MDPS system as defined in claim 1, wherein in the step of OHP, the electric current supplied to the motor is decreased to the second electric current reduction coefficient until the electric current supplied to the motor is a predetermined second minimum motor electric current smaller than the first minimum motor electric current, and when the electric current supplied to the motor becomes smaller than the second minimum motor electric current, the electric current supplied to the motor is increased to a second electric current increase coefficient smaller than the first electric current increase coefficient.

* * * * *